United States Patent [19]

Gottschalk et al.

[11] 4,418,994
[45] Dec. 6, 1983

[54] FILM MAGAZINE FOR MOTION PICTURE CAMERA

[75] Inventors: Robert E. Gottschalk, Los Angeles; Carl F. Fazekas, Tarzana, both of Calif.

[73] Assignee: Panavision, Incorporated, Tarzana, Calif.

[21] Appl. No.: 312,379

[22] Filed: Oct. 19, 1981

[51] Int. Cl.³ ............................................. G03B 23/02
[52] U.S. Cl. .................. 352/78 R; 352/172; 352/182; 242/199
[58] Field of Search ................. 352/172, 180, 182, 72, 352/78 R, 166, 21; 242/199, 200

[56] References Cited

U.S. PATENT DOCUMENTS

| | | | |
|---|---|---|---|
| 1,880,106 | 9/1932 | Robinson | 352/30 |
| 1,992,706 | 2/1935 | Lira | 352/182 |
| 2,107,039 | 2/1938 | Leventhal et al. | 352/119 |
| 3,601,641 | 8/1971 | Baermann | 310/93 |
| 4,312,576 | 1/1982 | Dejeney | 352/21 |

FOREIGN PATENT DOCUMENTS

| | | | |
|---|---|---|---|
| 1167181 | 4/1964 | Fed. Rep. of Germany | 352/172 |
| 1198924 | 7/1970 | United Kingdom | 352/172 |

*Primary Examiner*—Monroe H. Hayes
*Attorney, Agent, or Firm*—Ronald E. Grubman; John B. Young

[57] ABSTRACT

A film magazine for a motion picture camera contains apparatus for maintaining the tension in the film strip from the supply reel and in the film strip to the takeup reel, within predetermined limits, to permit start-and-stop operations of the camera while minimizing danger of damage to the film. The supply reel is connected to an eddy current brake, and a takeup reel is powered by a motor responsive to a tension control device. The eddy current brake on the supply reel provides braking torque of relatively high magnitude when the supply reel is large in diameter, and the braking torque reduces gradually to a minimum as the diameter reduces.

Tension in the film strip leading to the takeup reel is controlled by a tension measuring device which acts to vary the power delivered to the motor driving the takeup reel, to obtain uniform winding tightness.

Loading of a full reel of film into the magazine is accomplished while a reel-contacting measuring device is latched in retracted position; closing of the magazine cover releases the latch.

6 Claims, 10 Drawing Figures

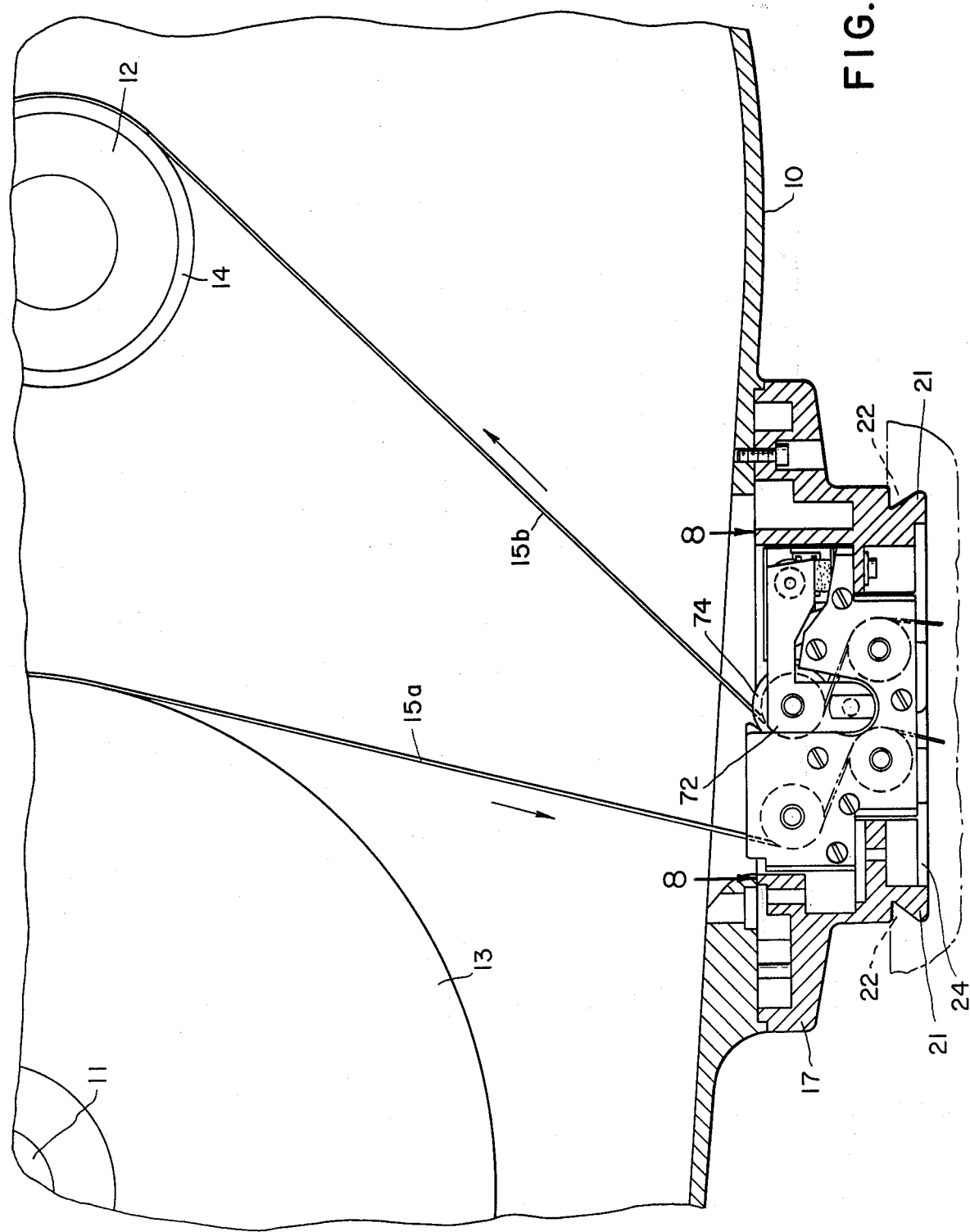

FILM MAGAZINE FOR MOTION PICTURE CAMERA

This invention relates to a film magazine for a motion picture camera, which camera may be operated at high speed. It is desirable to maintain uniform tension on the film strip leaving the supply reel, but prior devices have applied the same intensity of braking torque regardless of the film footage on the supply reel. The result was that adequate braking effort was provided when the supply reel contained maximum footage, and too much braking effect when the footage on the supply reel approached a minimum. This could lead to film damage and to "cinch marks" on the film. In accordance with this invention, the applied braking torque is at a maximum when the supply reel is full, and is at a minimum when the feed reel is nearly empty. Also, it is required that there always be maximum braking on the supply reel when the magazine is removed from the camera, or when there is no voltage applied to the brake. In this way undesirable slack movement of film out of the supply reel is prevented.

Another feature of the present invention relates to a device for maintaining substantially constant tension on the film strip leading to the takeup reel regardless of speed, in order that the film strip wound on the takeup reel produce substantially uniform density of the film pack from start to finish, without film damage or cinch marks. This feature of the invention is accomplished by means of a film roller contacting the film strip leading to the takeup reel. The film roller is mounted upon a spring-loaded support or carrier which is pivotally mounted about an axis parallel to the roller axis. The roller and its carrier move laterally through an arc against the spring force when the tension in the strip increases. This arcuate movement operates through a position-sensing semi-conductor device which responds to change in a magnetic field, and serves to vary the power supplied to the motor driving the takeup reel.

Other and more detailed objects and advantages will appear hereinafter.

In the drawings:

The FIGS. show a preferred embodiment of this invention.

FIG. 7 is a sectional view partly broken away, showing a portion of FIG. 1 on an enlarged scale.

Figure 1:
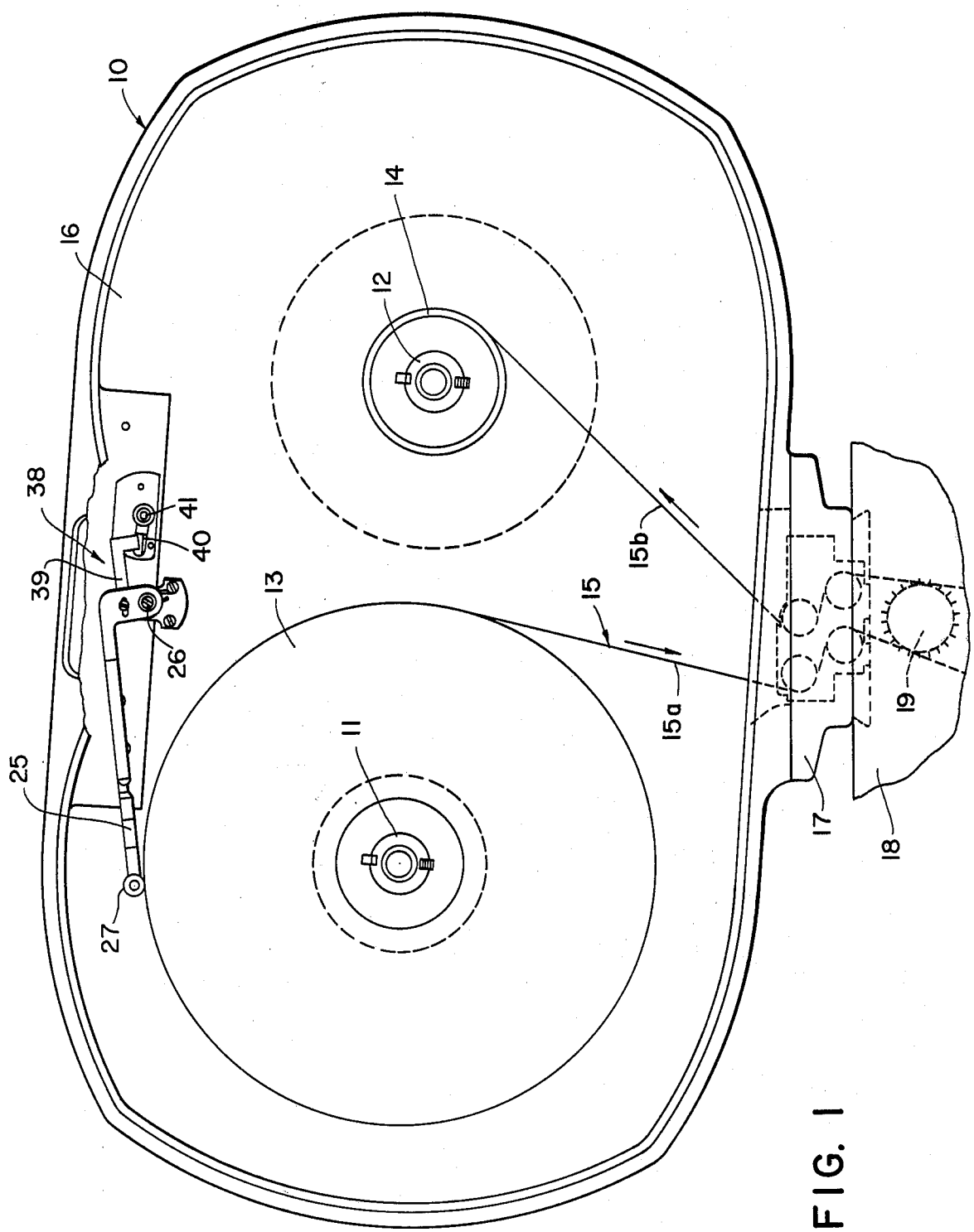
FIG. 1 is a side elevation of a film magazine for a motion picture camera, the magazine cover being removed.

Referring to the drawings, the film magazine generally designated 10 contains a supply hub 11 and a takeup hub 12 both mounted for rotation within the interior space 16 of the magazine 10. A supply reel 13 of film is mounted on the hub 11 and a takeup reel 14 is mounted on the takeup hub 12. A film strip generally designated 15 extends from the supply reel 13 and passes through the light trap block 17 into the interior of the motion picture camera 18. A single sprocket wheel 19 may be employed in the motion picture camera 18 for controlling the rate of movement of the film strip 15 into and out of the motion picture camera 18. The portion of the film strip extending from the supply reel 13 to the block 17 is designated 15a, and the portion extending from the block 17 to the takeup reel 14 is designated 15b.

The block 17 normally remains fixed to the film magazine 10 and it carries dovetail parts 21 for reception into corresponding dovetail parts 22 on the housing of the motion picture camera 18, on opposite sides of the opening 24. A motor 23 on the magazine 10 drives the takeup hub 12 through a one-way clutch, not shown.

Figure 2:
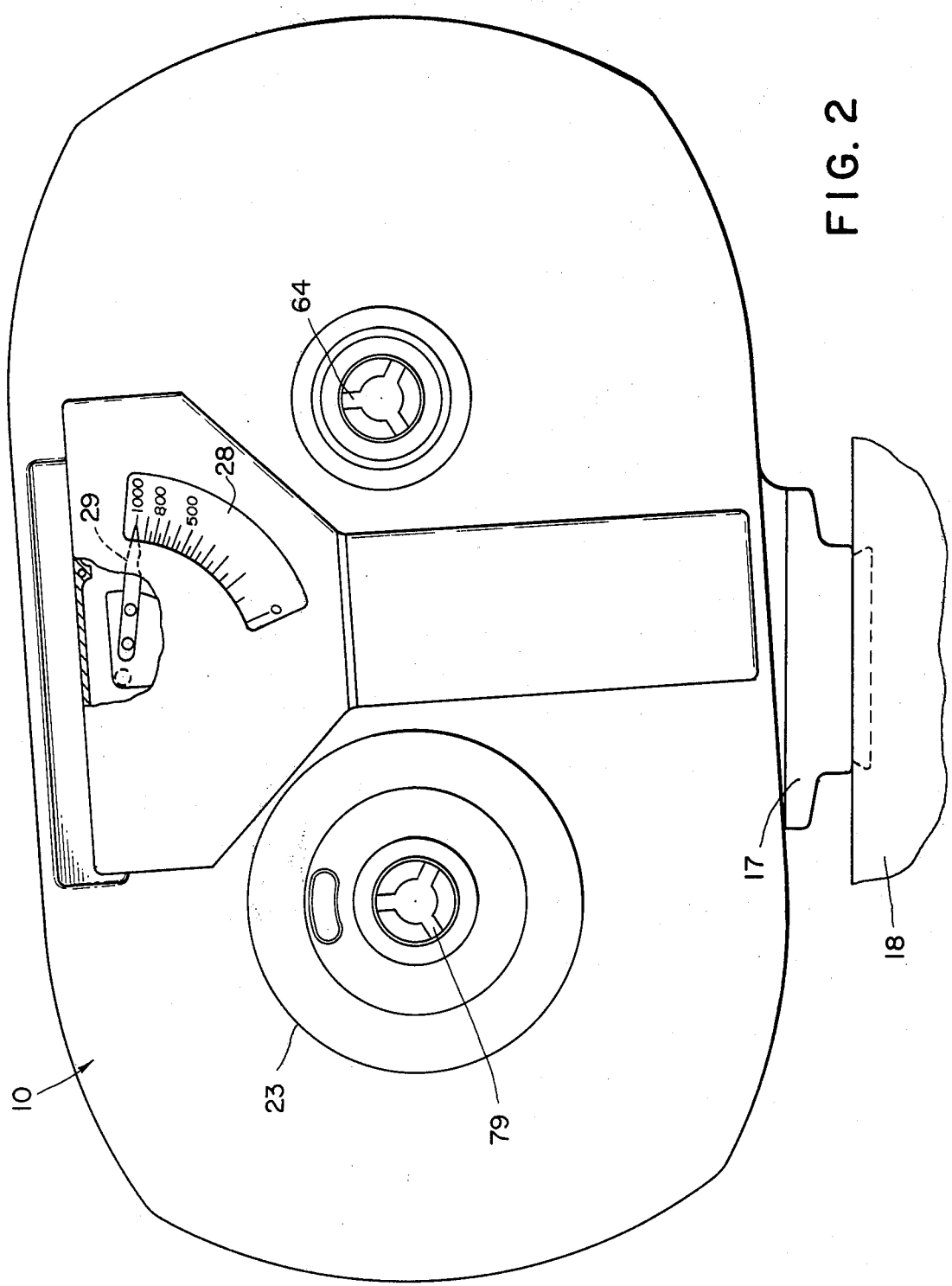
FIG. 2 is a side elevation showing the other side of the same film magazine.

In accordance with this invention, means are provided for measuring the diameter of the supply reel 13, and as shown in the drawings, this means includes an arm 25 pivotally mounted on the stub shaft 26 within the interior space 16 of the film magazine 10. Laterally spaced rollers 27 on the swinging end of the arm 25 contact the outer edge portions of the supply reel 13. As the size of the supply reel 13 grows smaller during operation of the camera 18, the rollers 27 and arm 25 move from the full line position through the phantom line position shown in FIG. 3. A calibrated stationary scale 28 (FIG. 2) fixed with respect to the magazine 10 cooperates with a pointer 29 fixed on the same stub shaft 26 with the arm 25, to provide a visual indication of the amount of film remaining on the supply reel 13. Also fixed for movement with the stub shaft 26 is a quadrant 30 carrying an electrical contact finger 31 adapted for sliding contact with the potentiometer 32 fixed within the film magazine 10. When the supply reel 13 is of maximum diameter, for example, when it contains 1,000 feet of motion picture film, the finger 31 begins contact with one end of the potentiometer 32. The potentiometer acts through a control device 36 to regulate the braking torgue applied to the supply reel 13, as described below.

Figure 4:
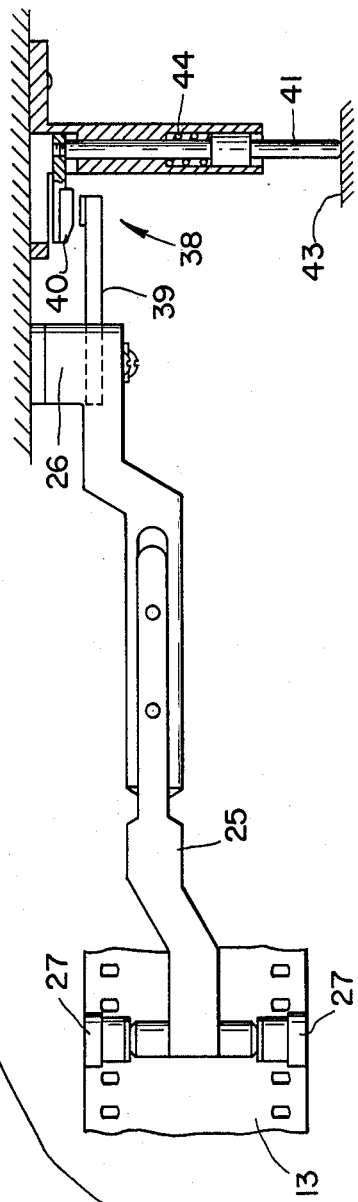
FIG. 4 is a top plan view, partly in section, taken substantially on the lines 4—4 as shown on FIG. 3.

A latching mechanism generally designated 38 is provided for holding the arm 25 and rollers 27 in an elevated inoperative position to permit installation of a full supply reel 13 without interference from the arm or rollers. The latching mechanism 38 includes a rearward extension 39 secured to the arm 25 and a bar 40 fixed to the slidable pin 41. When the supply reel 13 is to be installed or removed, the arm 25 is lifted manually to engage the extension 39 with a lip on the bar 40. Closing of the magazine cover 43 (FIG. 4) depresses the pin 41 to disconnect the latching parts 39 and 40. The torsion spring 42 encircling the stub shaft 26 then moves the swinging arm 25 to bring the rollers 27 into contact with the outer surface of the supply reel 13. The spring 44 returns the bar 40 to the latching position when the magazine cover 43 is opened.

Figure 3:
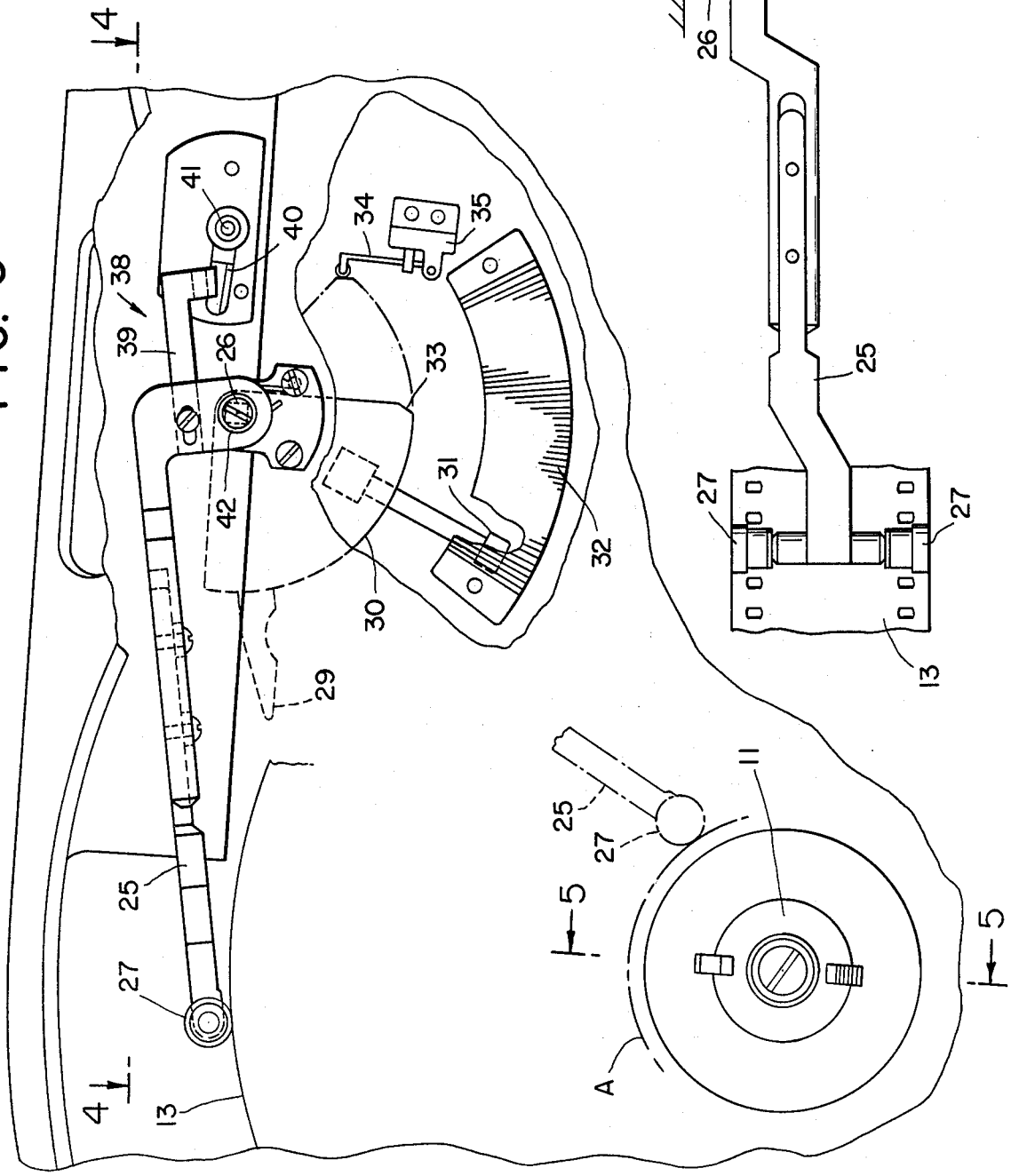
FIG. 3 is an enlarged view partly broken away, showing a portion of FIG. 1.
Figure 6:
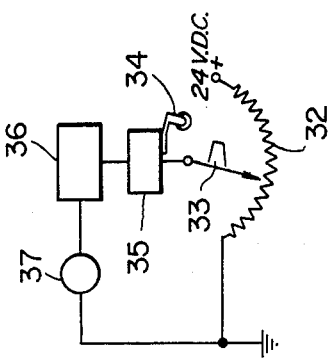
FIG. 6 is a diagram showing electrical connections.

As the supply reel 13 becomes smaller in diameter, the arm 25 turns in a counterclockwise direction, as viewed in FIG. 3, the quadrant 30 moves with the arm 25, and the finger 31 slides along the arcuate length of the potentiometer 32. At the same time the pointer 29 moves to indicate on the stationary scale 28 the number of feet of film remaining in the supply reel 13.

Figure 5:
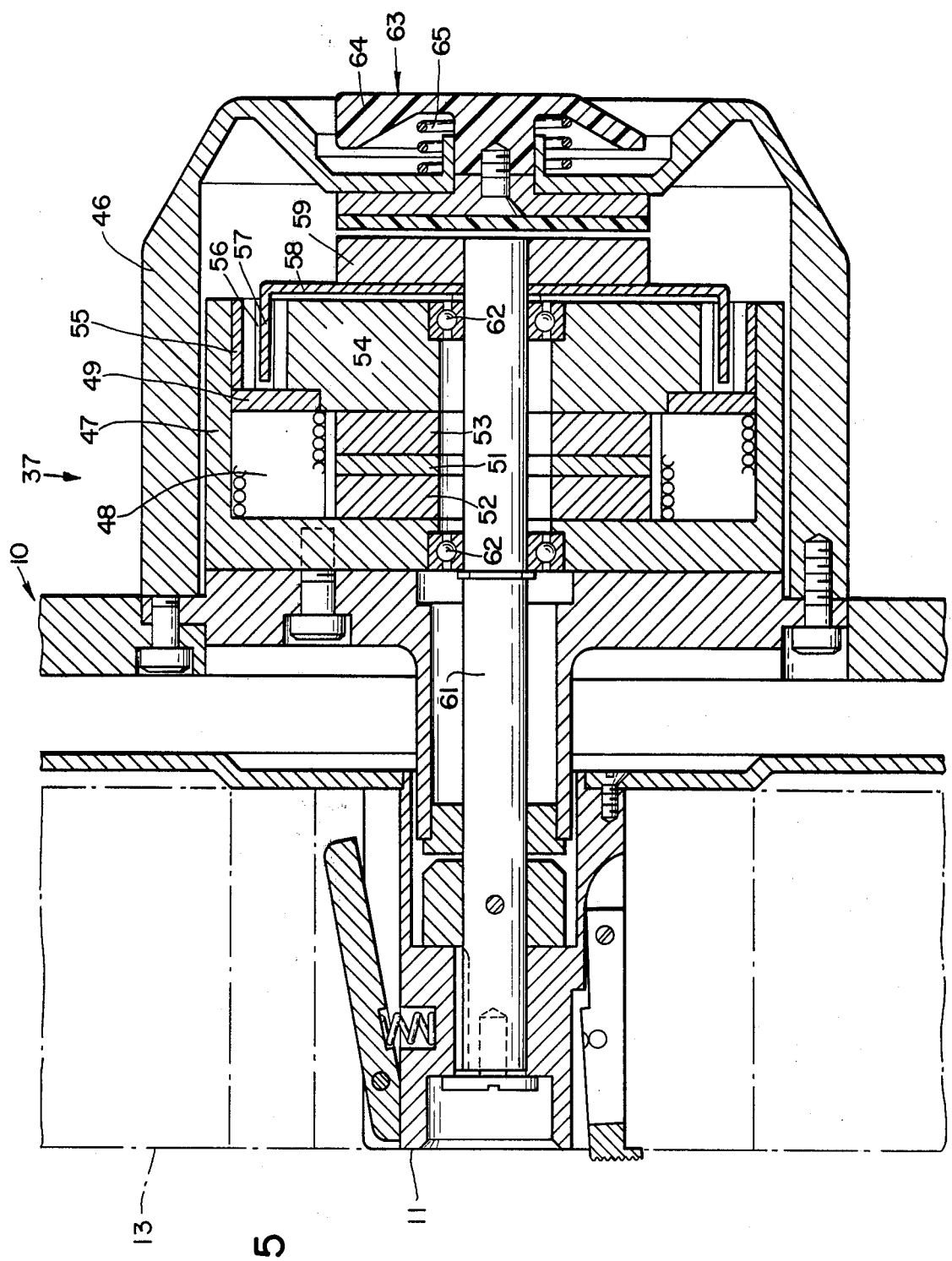
FIG. 5 is a sectional elevation taken substantially on the lines 5—5 as shown on FIG. 3.
Figure 8:
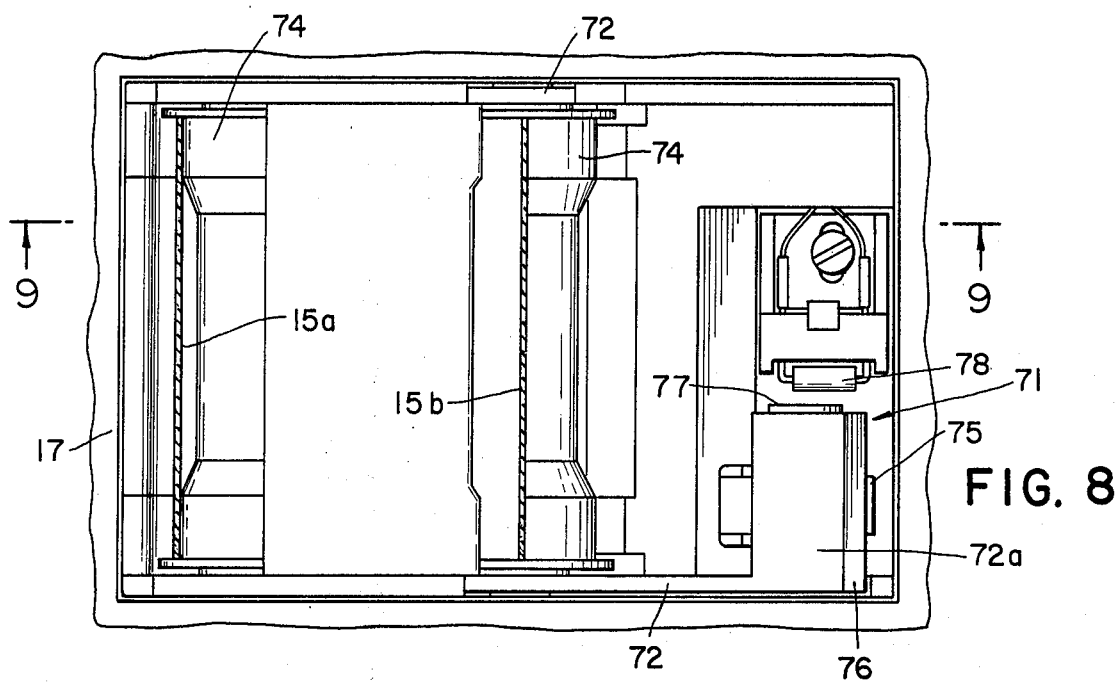
FIG. 8 is a sectional view partly broken away, taken substantially on the lines 8—8 as shown on FIG. 7.

The potentiometer 32 is electrically connected to a control device 36 for the eddy current brake 37 shown in FIG. 5. The construction is such that before the left hand end of the potentiometer 32 is contacted by the finger 31 (as shown in FIG. 3), the maximum braking torque is applied by the fail-safe brake 37. When the amount of film in the supply reel 13 has been reduced to the size shown at phantom line "A", the arm 25 and rollers 27 pass over-center and the shoulder 33 on the quadrant 30 contacts the actuator arm 34 on the microswitch 35, shutting off power to the camera 18, motor 23, and brake 37.

As a practical example, when the amount of film on the supply reel 13 is greater than 750 feet, a maximum braking torque of 28 inch-ounces is applied by the eddy current brake 37. As the amount of film diminishes gradually, the braking torque also diminishes gradually to a value of only 10 inch-ounces, at "A". When the motion picture camera 18 is not running and no electrical energy is supplied to the eddy current brake 37, the highest braking torque, for example 28 inch-ounces, is exerted to prevent "spillage", that is, unwanted movement of film strip from the supply reel 13.

The eddy current brake 37, shown in FIG. 5, operates in a similar fashion to that disclosed in the Baermann U.S. Pat. No. 3,601,641, in which the magnetic field produced by permanent magnets can be decreased by an electronic field derived from field windings to produce maximum braking effort with minimum power, and vice versa. When the electric power is cut off, the maximum braking effort is achieved.

The brake 37 has a stationary housing 46 enclosing a stationary conductor case 47. A stationary wire coil 48 is positioned within the conductor case 47 and is contacted by the mounting ring 49. A permanent magnet 51 is positioned within the coil 48 between the magnet extenders 52 and 53. The conductive polarity concentrator, inboard, 54 contacts the magnet extender 53 and is encircled by the conductive polarity concentrator, outboard 55. A gap 56 is provided between them and into this gap 56 extends the axial portion 57 of the ferromagnetic eddy current conductor 58. This member 58 and the ring 59 are fixed to the shaft 61 which is mounted in spaced bearings 62. The projecting end of the shaft 61 carries the supply hub 11. The only rotating components are the parts 58, 59 and 61. When electric current flows through the coil 48 in the proper direction, an electromagnetic field is generated that opposes the magnetic field created by the permanent magnet 51. The more current passing through the coil 48 the less braking effect of the permanent magnet 51 on the rotating eddy current conductor 58.

A friction drive device 63 has a manually accessible knob 64 which may be moved against a spring 65 for frictionally driving the ring 59, shaft 61, and supply hub 11 to take up any slack in the film strip 15a.

Figure 9:
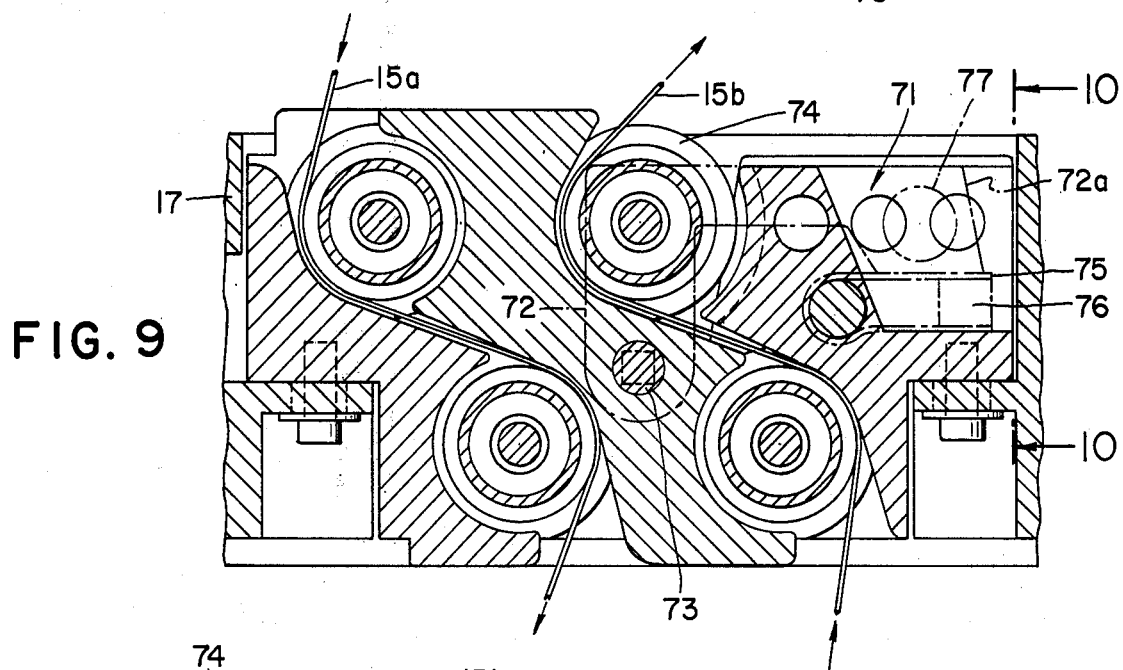
FIG. 9 is a sectional elevation taken substantially on the lines 9—9 as shown on FIG. 8.
Figure 10:
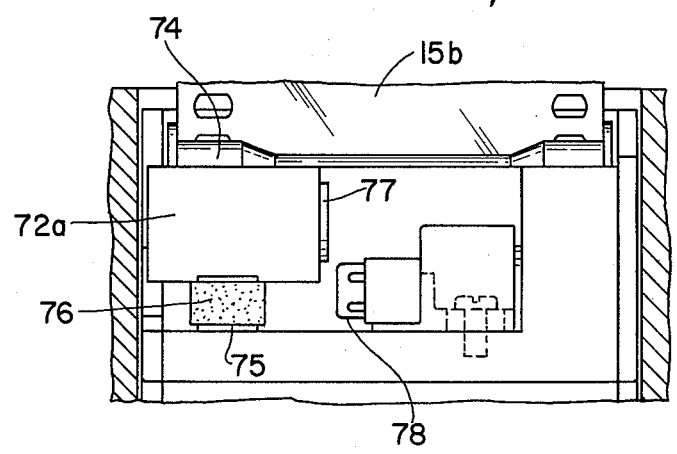
FIG. 10 is a sectional elevation taken substantially on the lines 10—10 as shown on FIG. 9.

As best shown in FIGS. 7-10, a semi-conductor device generally designated 71 responsive to change in a magnetic field is employed for controlling the tension in the film strip 15b leading to the takeup reel 12. A roller support 72 includes the shaft 73 mounted in the block 17 to pivot about the axis of shaft 73. A film roller 74 is mounted to rotate on the roller support 72. Clockwise motion of the roller support 72 as viewed in FIGS. 7 and 9 is resisted by a hairpin spring 75, and a sponge 76 serves as a dampener. A permanent magnet 77 is mounted on an extension 72a of the support 72 in close proximity to a Hall Effect transducer 78 so that movement of the permanent magnet 77 about the axis of the shaft 73 varies the number of lines of force which are cut, and in this way the control device for the film takeup motor 23 changes the power supplied to the motor to vary its output torque. Accordingly, the tension in the film strip 15b is held within desirable limits.

A manually accessible knob 79 is arranged to drive through a friction device (not shown) to turn the motor shaft for tensioning the film strip 15b. The construction is similar to that described above in connection with the eddy current brake 37.

In operation, the motion picture camera may be operated at high speed between many starts and stops. The film strip 15a between the supply reel 13 and the camera 18 does not become loose because of "spillage" each time the operation of the camera is interrupted. Moreover, the film strip 15b extending from the film roller 74 to the takeup reel 14 does not become loose, either, since the tension in the film strip 15b is controlled by the device 71 which includes the pivoted support member or carrier 72 for the film roller 74. Accordingly, damage or breakage of either film strip is minimized during high speed start-and-stop operations of the camera, and cinch marks on the film are avoided.

Having fully described our invention, it is to be understood that we are not to be limited to the details herein set forth but that our invention is of the full scope of the appended claims.

We claim:

1. A film magazine for a motion picture camera comprising:
   a casing;
   a supply hub rotatably mounted within said casing, the supply hub adapted to carry a supply reel;
   a motor-driven take-up hub adapted to carry a take-up reel, so that a film strip may pass from the supply reel, out of the magazine and into a camera, and out of the camera and onto the take-up reel;
   sensing means for generating a signal indicative of the quantity of film on the supply reel; and
   braking means coupled to the sensing means for applying a braking torque to the supply reel, the braking torque being greatest when the sensing means generates a signal indicative of a full supply reel, and gradually decreasing as the amount of film on the supply reel decreases, and then increasing again after the amount of film on the supply reel film reaches a predetermined amount.

2. The device of claim 1 further comprising:
   a sensing arm rotatably mounted about a point of rotation, the arm being coupled to the sensing means; and
   a roller on a first end of the sensing arm, positioned to rest on the film stored on the supply reel so that as the supply of film decreases the sensing arm will move, thereby enabling the sensing means to generate said signal.

3. The device of claim 2 wherein the braking means comprises an eddy current brake, the magnetic field of the eddy current brake being created by a permanent magnet and an electromagnet.

4. The device of claim 3 wherein the sensing means comprises a potentiometer.

5. A film magazine for a motion picture camera comprising:
   a casing;
   a supply hub rotatably mounted within said casing, the supply hub being adapted to carry a supply reel;

a motor driven take-up hub within the casing adapted to carry a take-up reel, so that a film strip may pass from the supply reel, out of the magazine and into the camera, and out of the camera and onto the take-up reel;

a roller support adapted to pivot about a point of rotation;

a roller adapted to carry the film strip, the roller being affixed to the roller support;

a magnet affixed to the roller support;

a spring for biasing the roller support;

a Hall Effect transducer affixed to the casing for sensing the strength of the magnetic field produced by the magnet, and generating a signal in response to the position of the roller support and thus to the tension of the film strip leading to the take-up reel; and a motor driving the take-up reel, the motor coupled to the Hall Effect transducer, the motor applying variable torque to the take-up reel in response to a signal produced by the Hall Effect transducer.

6. The device of claim 5 further comprising:

a sensing arm rotatably mounted about a point of rotation;

a roller on a first end of the arm positioned to rest on the film stored on the supply reel so that as the supply of film decreases the arm will move;

sensing means coupled to the arm for generating a signal indicative of the quantity of film on the supply reel; and braking means coupled to the sensing means for applying a braking torque to the supply reel, the braking torque being greatest when the sensing means generates a signal indicative of a full supply reel, and gradually decreasing as the quantity of film on the supply reel decreases, and then increasing again after the amount of film on the supply reel is diminished to a predetermined amount.

* * * * *